United States Patent [19]
Kiefer et al.

[11] Patent Number: 6,042,162
[45] Date of Patent: Mar. 28, 2000

[54] PROTECTIVE BUMPER FOR A TRANSPORT REFRIGERATION UNIT

[75] Inventors: David D. Kiefer, Watkinsville; Michael E. Davis, Bogart, both of Ga.

[73] Assignee: Carrier Corporation, Syracuse, N.Y.

[21] Appl. No.: 09/027,386

[22] Filed: Feb. 20, 1998

[51] Int. Cl.$^7$ .................................................. B60R 19/48
[52] U.S. Cl. ............................................ 293/117; 293/102
[58] Field of Search ...................................... 293/102, 117

[56] References Cited

U.S. PATENT DOCUMENTS

| | | | |
|---|---|---|---|
| 4,310,192 | 1/1982 | Fitzgerald | 296/180.4 |
| 4,365,484 | 12/1982 | Carson et al. | 62/239 |
| 4,551,986 | 11/1985 | Anderson et al. | 62/239 |
| 5,711,073 | 1/1998 | Tippmann et al. | 29/897 |

*Primary Examiner*—D. Glenn Dayoan
*Assistant Examiner*—Chad D Wells

[57] ABSTRACT

A protective bumper assembly for a refrigeration unit of the type adapted to be mounted on the front wall of a trailer. The refrigeration unit includes an outer cover, and a structural framework which includes a pair of vertically extending structural elements located at opposite rear corners of the refrigeration unit adjacent to the front wall of the trailer. The bumper assembly includes two vertically extending structural members, each of which is adapted to be structurally coupled to one of the vertically extending structural elements of the refrigeration unit. A portion of the vertically extending structural member extends above the outer cover of the unit. A pair of horizontally extending structural members also located outside the outer cover of the refrigeration unit are attached to the ends of the vertically extending members at one end thereof and the other ends extend forwardly towards the front of the refrigeration unit. The ends of the horizontally extending structural members, which extend forwardly, terminate at a location forward of the outer cover and spaced from one another. An elongated structural bumper extends substantially horizontally at a location forwardly of the outer cover where it is attached to the other ends of the horizontally extending structural members.

8 Claims, 4 Drawing Sheets

PROTECTIVE BUMPER FOR A TRANSPORT REFRIGERATION UNIT

BACKGROUND OF THE INVENTION

1. Field of the Invention

The invention relates to a protective bumper assembly for a refrigeration unit of the type adapted to be mounted on the front wall of a trailer. More specifically, it relates to such a bumper assembly which transmits forces from the bumper to the front wall of the trailer.

2. Description of the Prior Art

Refrigeration units adapted to be mounted to the front end of the trailer of a tractor trailer vehicle for controlling the temperature within the trailer are well known in the art. It is common practice for such refrigerated trailers to be stored in a rail yard, or the like, without the tractor unit attached thereto. It is also common practice for such refrigerated trailers to be shipped by rail without the trailers attached thereto. During such storage or transportation of the trailer without the tractor attached, the refrigeration unit is subject to damage as a result of impact with other trailer and the refrigeration units of other trailers.

Various protective bumpers and bumper systems have been used with such units for the purpose of attempting to prevent or minimize damage to the refrigeration units. Known bumper systems have either been not robust enough to prevent damage or they transmitted the force of the collision into the frame of the refrigeration unit; thus, causing the frame to distort and causing internal unit damage.

Accordingly, it is desirable to provide a protective bumper assembly for a refrigeration unit of this type which will protect the unit without the possibility of causing damage to the internal framework of the unit. It is also deemed desirable to have a protective bumper of the type described, which is relatively inexpensive and can protect both the top and bottom of the refrigeration unit.

SUMMARY OF THE INVENTION

A protective bumper assembly for a refrigeration unit of the type adapted to be mounted on the front wall of a trailer. The refrigeration unit includes an outer cover, and a structural framework which includes a pair of vertically extending structural elements located at opposite rear corners of the refrigeration unit adjacent to the front wall of the trailer. The bumper assembly includes two vertically extending structural members, each of which is adapted to be structurally coupled to one of the vertically extending structural elements of the refrigeration unit. A portion of the vertically extending structural member extends above the outer cover of the unit. A pair of horizontally extending structural members also located outside the outer cover of the refrigeration unit are attached to the ends of the vertically extending members at one end thereof and the other ends extend forwardly towards the front of the refrigeration unit. The ends of the horizontally extending structural members, which extend forwardly, terminate at a location forward of the outer cover and spaced from one another. An elongated structural bumper extends substantially horizontally at a location forwardly of the outer cover where it is attached to the other ends of the horizontally extending structural members.

BRIEF DESCRIPTION OF THE DRAWINGS

The invention may be better understood and its objects and advantages will become apparent to those skilled in the art by reference to the accompanying drawings, in which.

DESCRIPTION OF THE PREFERRED EMBODIMENT

Figure 1:
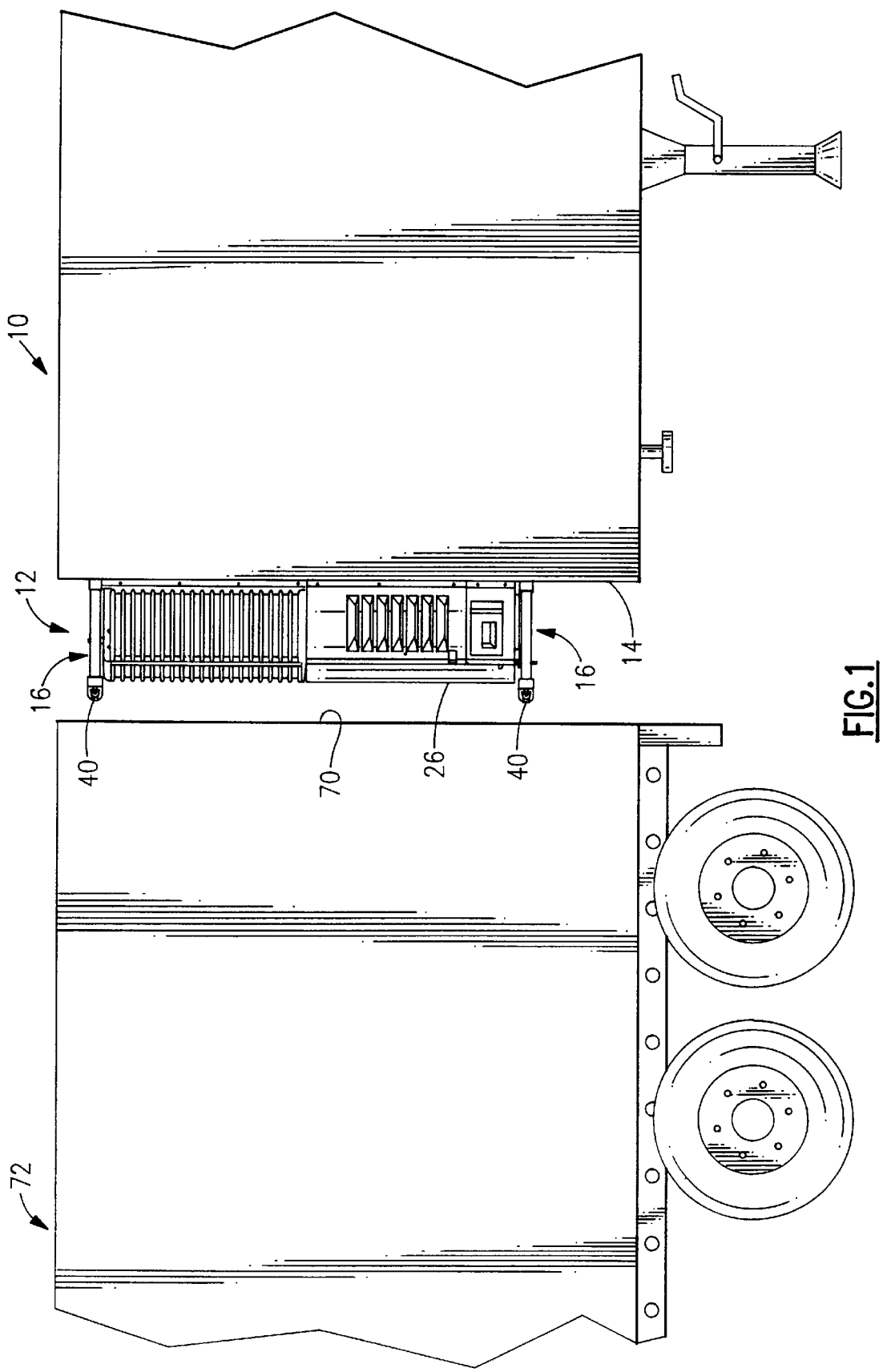
FIG. 1 is a side view of the front end of a trailer having a refrigeration unit mounted thereon, which includes protective bumper assemblies according to the present invention.

Referring first to FIG. 1, a fragmentary front end of a large transport trailer 10 is shown with a transport refrigeration unit 12 shown mounted on the front wall 14 of the trailer. The refrigeration unit 12 is of the type known in the art and comprises generally a one-piece, self contained refrigeration/heating unit powered by a diesel engine. An internal structural framework supports all of the components within the refrigeration unit and facilitates attachment of the unit to the trailer front wall. Bumper assemblies, according to the present invention, are shown installed at both the top and bottom of the refrigeration unit 12.

With reference to FIGS. 1 through 4, the previously mentioned structural framework includes a pair of vertically extending rear frame posts 18 located at the opposite rear corners of the unit 12 and a pair of horizontally extending structural members 20 attached to the upper ends of the rear frame posts 18. The posts 18 are tubular members having a hollow rectangular cross section. Other structural elements, such as the diagonal 21 illustrated in FIG. 4, cooperate to make up the framework and to support all of the internal components of the refrigeration system and facilitate attachment of the unit to the trailer front wall. Specifically, with reference to FIGS. 2 and 4, the portion 22 of the refrigeration unit which houses the evaporator section of the refrigeration unit is designed to fit into a rectangular opening in the upper portion of the trailer front wall 14. When so installed, the rear surface 24 of the rear frame posts 18 are in confronting relationship with the front wall 14 of the trailer. Attachment of the refrigeration unit 12 to the trailer is then accomplished by passing suitable threaded fastening means through the rear frame posts 18, through the front wall of the trailer, and into engagement with suitable structure provided in the trailer front wall.

Figure 2:
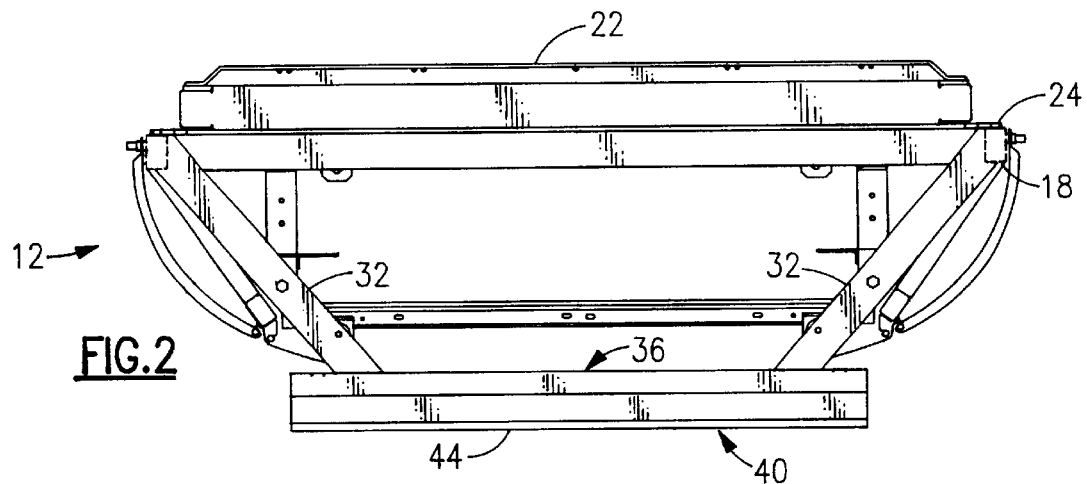
FIG. 2 is a plan view of a refrigeration unit of the type illustrated in FIG. 1.
Figure 4:
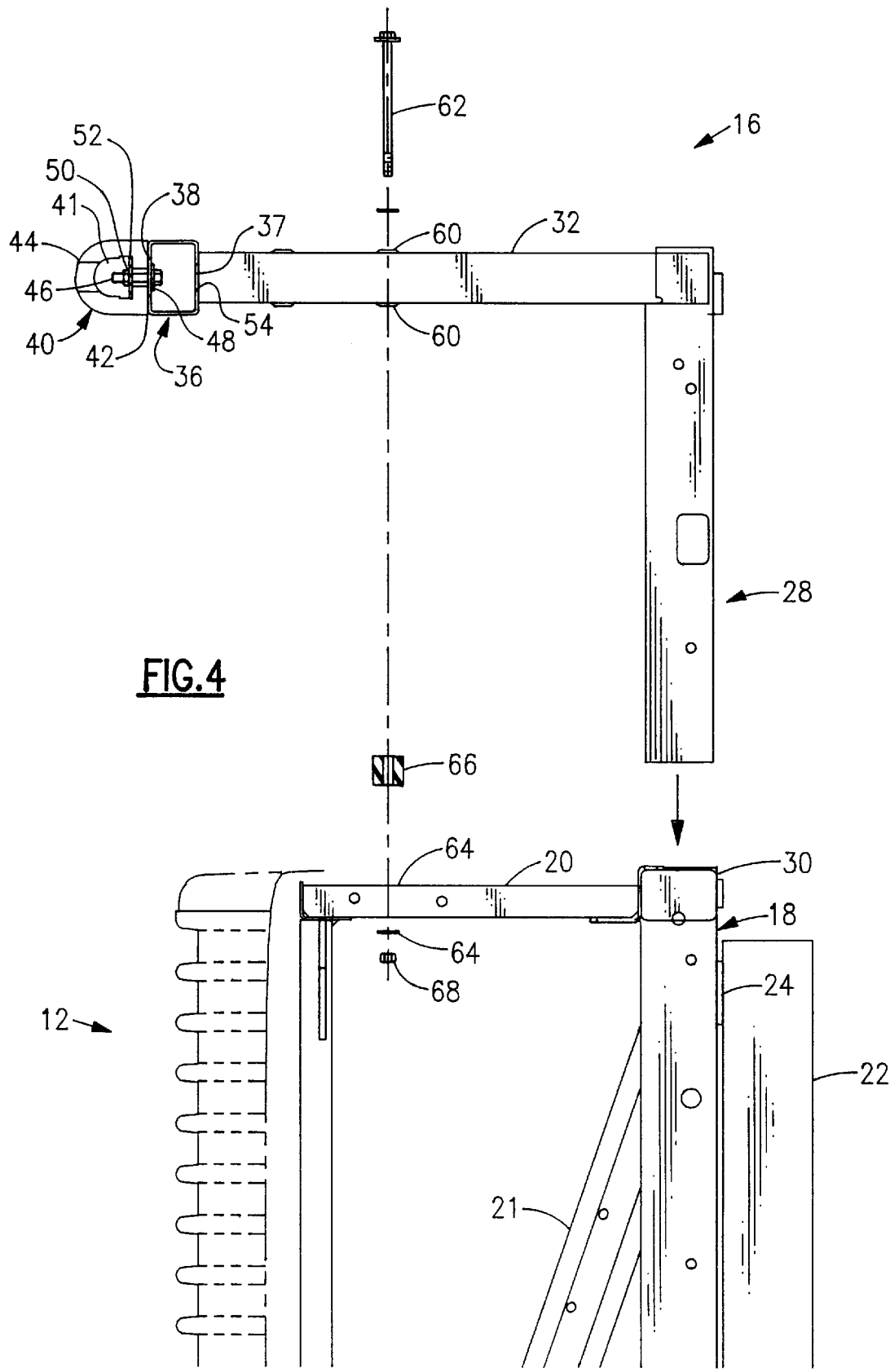
FIG. 4 is an enlarged sectional view of the top of a refrigeration unit and bumper assembly of the type illustrated in FIG. 1.
Figure 6:
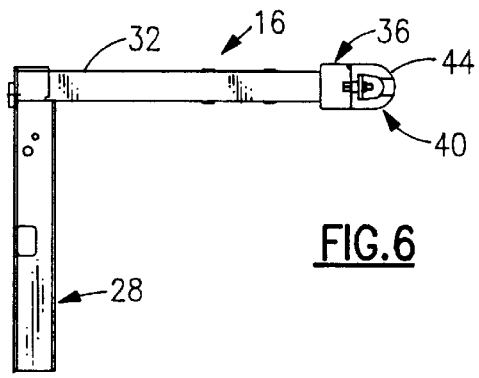
FIG. 6 is a view taken along line 6—6 of FIG. 5.
Figure 5:
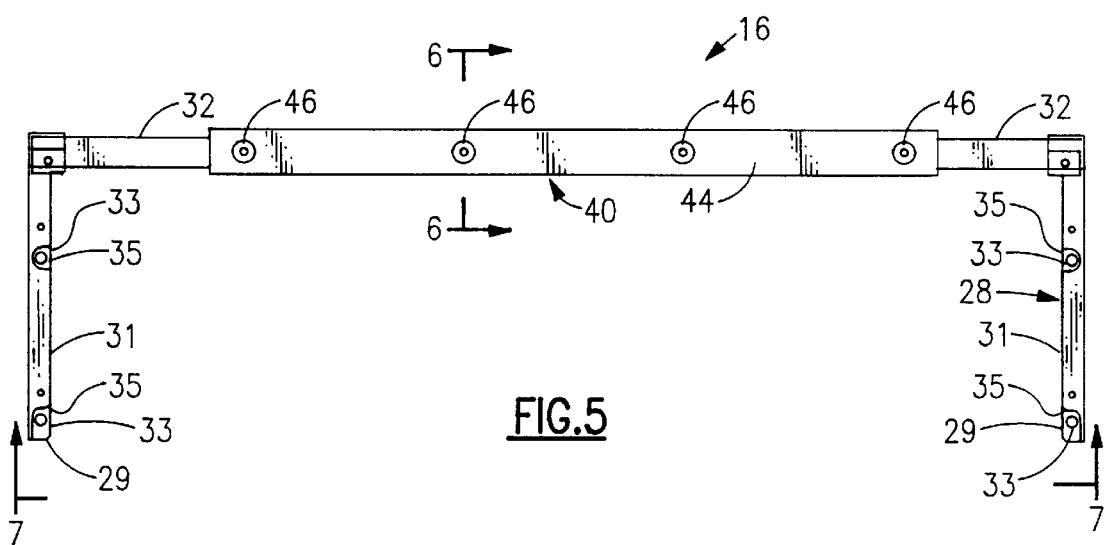
FIG. 5 is a front view of a bumper assembly according to the present invention.

Also supported by the structural framework is an outer cover 26, which includes the necessary air inlet and outlet openings for cooling, and which may be opened to provide access to the interior of the unit for maintenance and service. With reference to FIGS. 2 and 4, it should be noted that the top and bottom of the refrigeration unit 12 do not have an outer cover thereover and therefore are open. Accordingly, the top and bottom of the rear frame posts 18 are readily accessible from the top and bottom of the refrigeration unit. As will be appreciated, the structural interconnection of the bumper assemblies 16 to the refrigeration unit is accomplished by sliding vertically extending mounting channels 28 into the rear frame posts 18.

Figure 7:
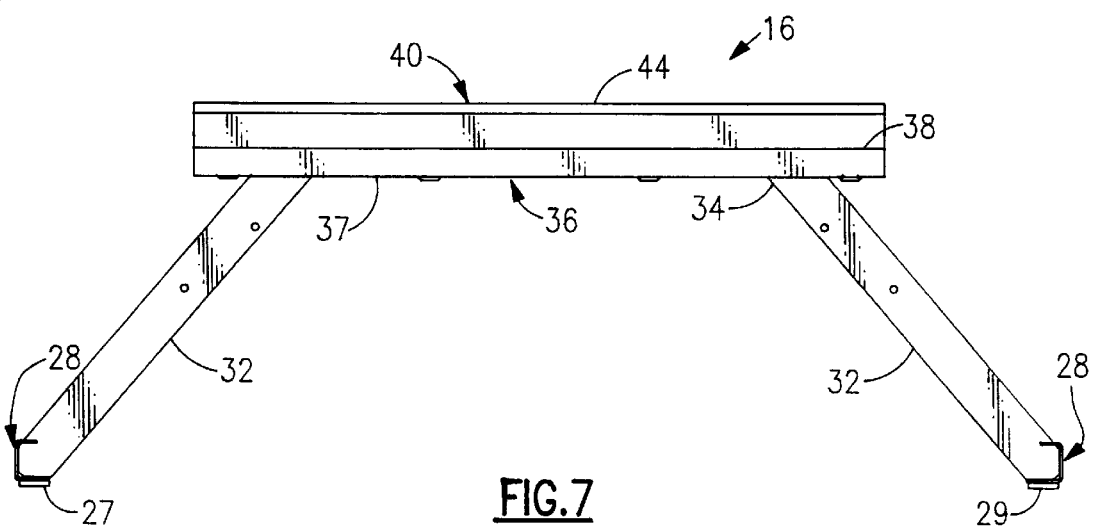
FIG. 7 is a view taken along the line 7—7 of FIG. 5.

Looking now at the bumper assembly 16 in detail, a pair of vertical bumper mounting channels 28, referred to above, are sized such as to be received within the rear frame post 18. As best seen in FIGS. 4 through 7, the bumper mounting channels 28 have a C-shaped cross section which define a rear leg 29 and a front leg 31. The rear legs 29 are each provided with a pair of openings 33 therein which facilitate attachment to the refrigeration unit 12 and trailer front wall 14. The front legs 31 are each provided with a cut out section 35 therein which allow clearance for passage of access to the openings 33 in the rear legs 29 and the mounting hardware associated therewith. Attached to the vertical bumper channels 28 at their upper ends 30 are a pair of diagonally extending support tubes 32. As best seen in FIGS. 2 and 7, the diagonal support tubes 32 extend from their attachment, preferably a welded connection angularly away from the rear frame posts 18. The other end 34 of the diagonal support tubes 32 are connected through welded connections to a horizontally extending tubular bumper support channel 36. The bumper support channel 36 is rectangular in cross section and the diagonal support tubes 32 are attached to the rear wall 37 thereof. As best seen in FIG. 4, attached to the front wall 38 of the bumper support channel 36 is an elongated rubber bumper 40. The bumper 40 has a substantially D-shaped cross section and defines a D-shaped interior chamber 41 therein. The rear wall 42 of the bumper 40 is in mating relationship with the front wall 38 of the bumper channel. A forwardly facing curved section 44 defines the protective engaging surface of the bumper. In the illustrated embodiment, the bumper 40 is attached to the channel 36 by a series of four threaded connectors 46 which pass from the interior of the bumper channel 36 through suitable mating openings 48 in the back of the bumper channel through axially aligned openings in the bumper 40 and then into threaded engagement with nuts 50 provided on a bumper attaching strip 52, which is located within the chamber 41 extending the length of the bumper. Access to the holes 48 in the front surface 38 of the bumper channel 36 is obtained through a series of larger openings 54 in the back wall 37 of the bumper channel 36.

With reference now to FIG. 4, installation of a bumper assembly 16 to a refrigeration unit 12 is accomplished by inserting the two vertical bumper channels 28 within the rear frame posts 18 of the refrigeration unit 12.

Once installed into the rear frame posts 18, suitable mounting hardware 58 is inserted through the mounting openings 33, through axially aligned openings in the rear frame posts 18 and into suitable mating threaded fasteners in the front wall support structure of the trailer 10. Such attachment provides a direct load bearing path from the rubber bumper through the bumper support channel 36 through the diagonal supports 32 to the vertical bumper channels 28. The channels 28 in turn transfer the load directly to the rear frame posts 18 and the structural elements of the front wall of the trailer 10.

With further reference to FIG. 4, each of the diagonal support tubes 32 is provided with a pair of openings 60 therein which are adapted to receive a vertically extending bolt 62, which in turn is received through openings 64 in the horizontally extending channels 20 forming part of the structural framework of the refrigeration unit. A spacer 66 is positioned between the bottom of the diagonal tube 32 and the horizontal channel 20. A suitable self locking nut 68 is threaded to the bottom of the bolt 62 to complete the connection. These connection points are intended to restrain the bumper assembly from undesired vertical or horizontal motion with respect to the refrigeration unit and are not intended to absorb any force imparted upon the bumper assembly by impact with another object. In this regard, the openings through which the bolt 62 pass in the diagonal support tubes 32 and the horizontal channel 20 are clearance holes to assure no force is transmitted from the diagonal tubes to the framework of the refrigeration unit 12.

Figure 3:
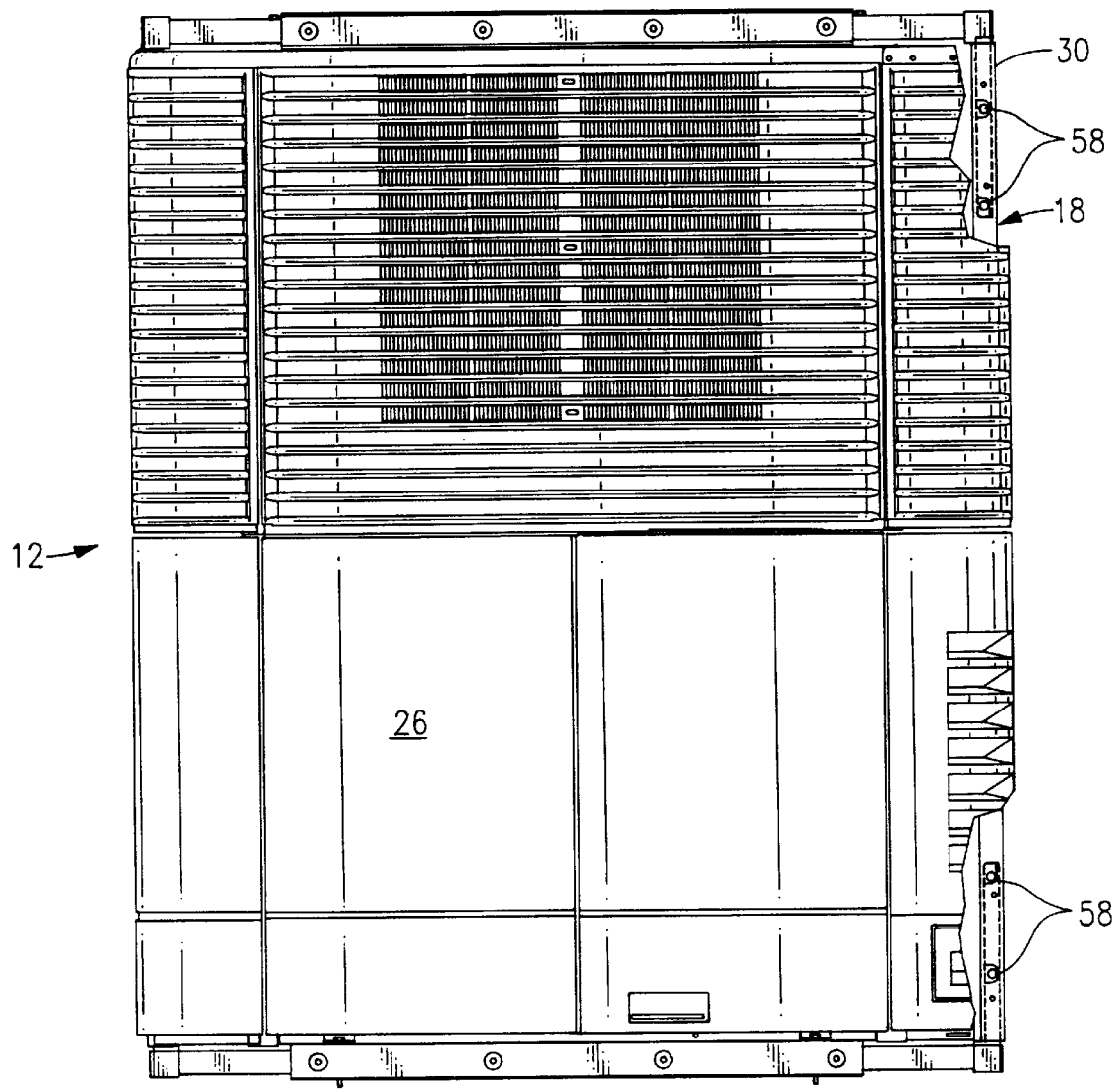
FIG. 3 is an elevation view of the refrigeration unit of the type illustrated in FIG. 1.

It should be appreciated that installation of a bumper assembly to the lower portion of the refrigeration unit 12 is accomplished in substantially the same manner as described above in connection with the upper part of the unit and, accordingly, will not be described in detail herein. It should be sufficient to understand the installation of a bumper assembly 16 to the lower end of the unit to point out that the rear frame posts 18 are open at the lower ends thereof. As a result, a bumper assembly 16 identical to that installed on the top of the unit may be inserted upwardly into the bottom of the rear frame posts 18 and attached to the front wall 14 of the trailer 10 in an identical manner, as illustrated in FIG. 3. A similar attachment of the diagonal support tubes 32, in a bottom installation, is made to an appropriate portion of the lower structure of the refrigeration unit 12.

It should be appreciated that the bumper assemblies 16 of the present invention are attached to the refrigeration unit 12 and front wall 14 of the trailer without requiring any modifications to the unit 12 or the trailer wall 14. The bumper assemblies, with the exception of the vertical mounting channels 28, extend outside of the envelope of the refrigeration unit as defined by the outer cover 26.

Referring back to FIG. 1, the back end 70 of a trailer 72 is shown in close proximity to the previously described trailer 10, which has a refrigeration unit 12 with upper and lower bumper assemblies installed thereon. It is evident from this Figure how the bumper will serve to protect the refrigeration unit 12 from damage as a result of possible impact with the other trailer 72.

What is claimed is:

1. A protective bumper and refrigeration unit of the type adapted to be mounted on the front wall of a trailer, the refrigeration unit having an outer cover and a structural framework including at least two vertically extending structural elements located at the rear of the refrigeration unit adjacent the wall of the trailer, said bumper assembly comprising:

at least two horizontally extending structural members, each of said horizontally extending structural members coupled at one end thereof to a different one of said vertically extending structural elements of the refrigeration unit structural framework; and a structural bumper positioned forwardly of the outer cover of the refrigeration unit, said bumper extending substantially horizontally and being structurally coupled therealong to the other end of each of said at least two horizontally extending structural members.

2. The apparatus of claim 1 wherein said structural bumper is located above the refrigeration unit, and further including a second substantially identical structural bumper located under the refrigeration unit.

3. A protective bumper and refrigeration unit of the type adapted to be mounted on the front wall of a trailer, the refrigeration unit having an outer cover and a structural framework including a pair of vertically extending structural elements located at opposite rear corners of the refrigeration unit adjacent to the front wall of the trailer, said bumper assembly comprising:

two vertically extending structural members, each of said vertically extending structural members structurally engaged at one end thereof with one of said vertically extending structural elements, the other end of each of said vertically extending structural members extending above said outer cover;

two substantially horizontally extending structural members located outside the outer cover of the refrigeration unit, each of said horizontal members being structurally attached at one end thereof to the other end of one of said vertically extending members and extending in a direction toward the front of said refrigeration unit, the other ends of each of said horizontal members being located, spaced from one another, forwardly of said outer cover; and an elongated structural bumper, said bumper extending substantially horizontally and being structurally attached to the other end of each of said horizontally extending structural members.

4. The apparatus of claim 3 wherein said vertically extending structural members are configured such that they may be received in telescopic relationship with the vertically extending structural elements of the refrigeration unit.

5. The apparatus of claim 4 further including means for structurally interconnecting the vertically extending structural elements of the refrigeration unit, and the vertically extending structural members of the protective bumper assembly to the front wall of the trailer.

6. The apparatus of claim 4 wherein said structural bumper is located above the refrigeration unit and further including a second substantially identical structural bumper located under the refrigeration unit.

7. The apparatus of claim 3 wherein said horizontally extending structural members converge toward one another from their structural engagement with said vertically extending structural members to their structural attachment to said bumper.

8. The apparatus of claim 7 wherein said structural bumper comprises a structural steel channel having a rear face to which said horizontal structural members are attached, and a front face, said bumper having an elastomeric protective element attached to said front face.

* * * * *